Dec. 29, 1964   A. F. HICKMAN   3,163,443
VEHICLE SPRING SUSPENSION FOR FRONT STEERING AXLE
Original Filed Feb. 23, 1961                        2 Sheets-Sheet 1
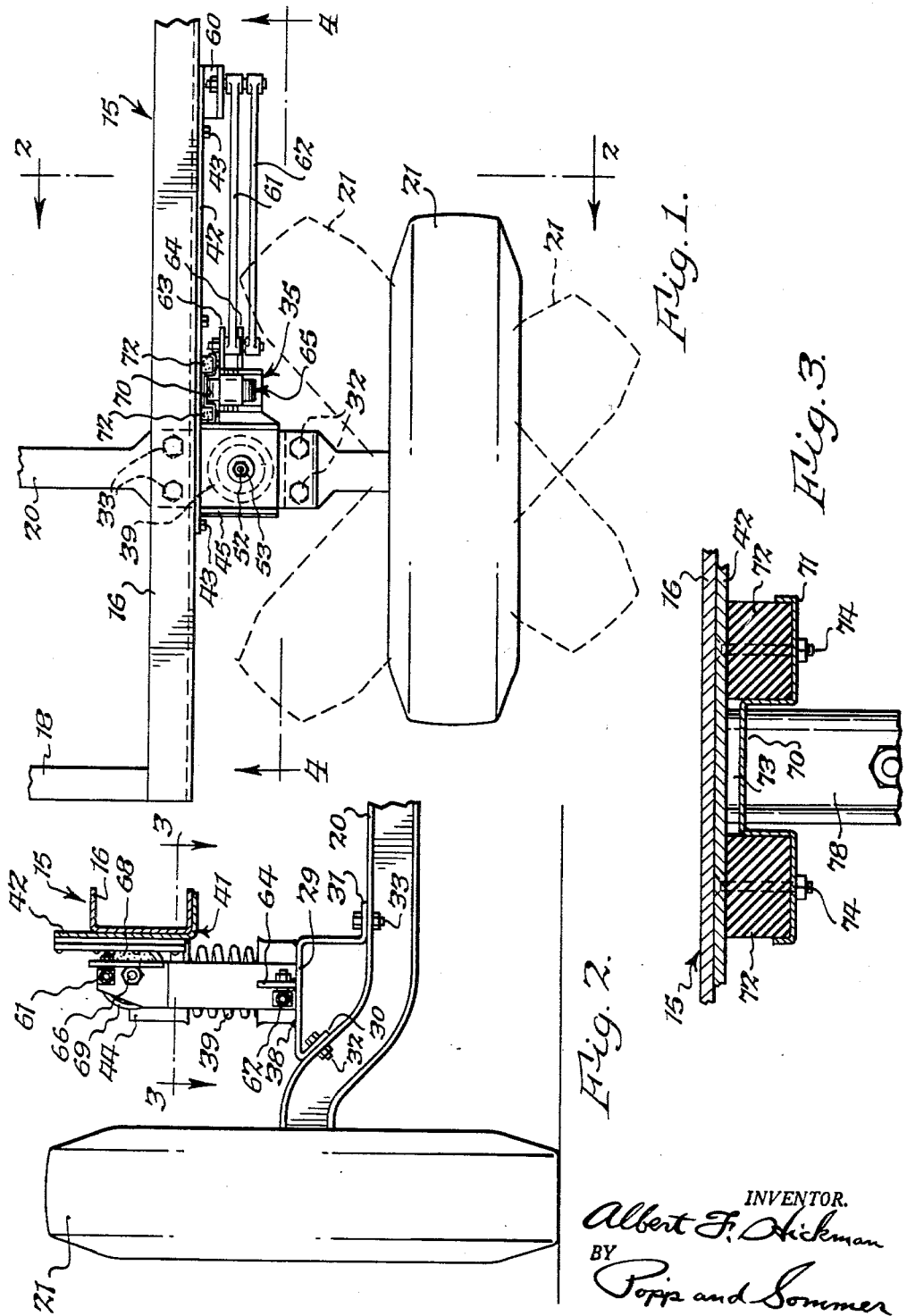
INVENTOR.
Albert F. Hickman
BY
Popp and Sommer
ATTORNEYS.

Dec. 29, 1964   A. F. HICKMAN   3,163,443
VEHICLE SPRING SUSPENSION FOR FRONT STEERING AXLE
Original Filed Feb. 23, 1961   2 Sheets-Sheet 2
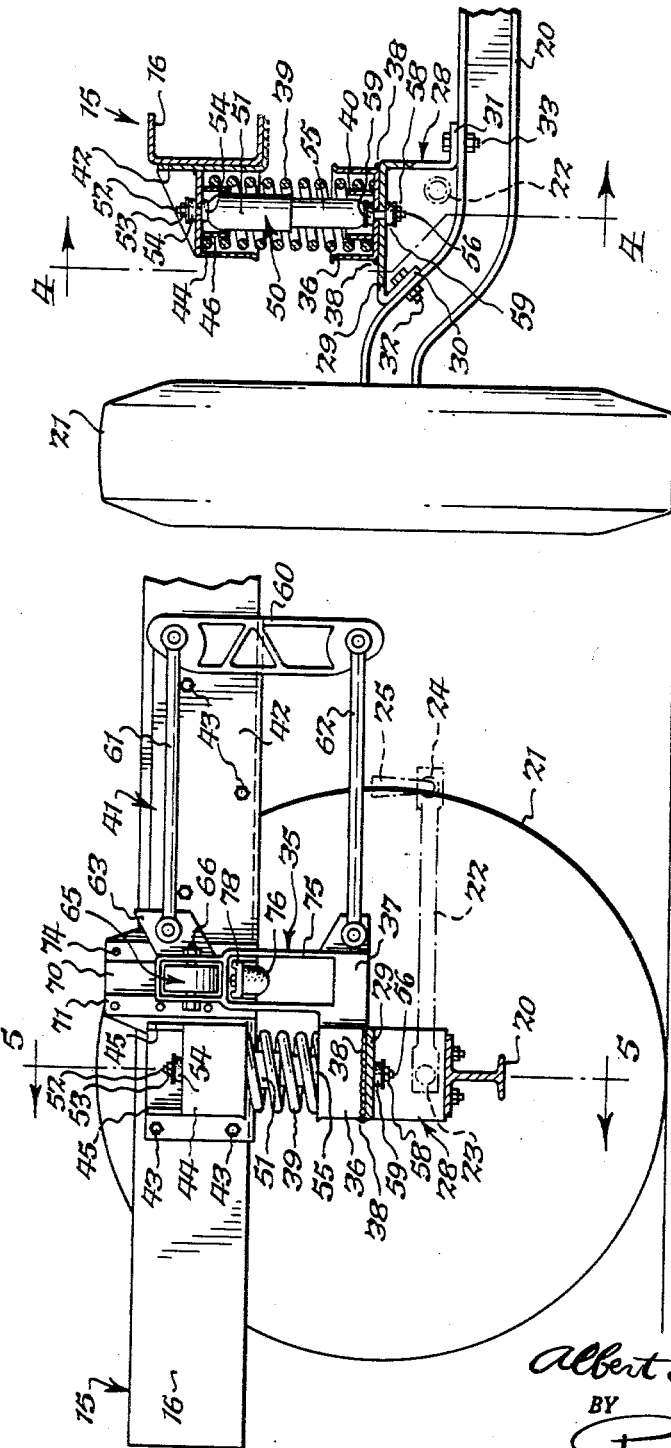
INVENTOR.
Albert F. Hickman
BY
Popp and Sommer
ATTORNEYS.

United States Patent Office 3,163,443
Patented Dec. 29, 1964

3,163,443
VEHICLE SPRING SUSPENSION FOR FRONT STEERING AXLE
Albert F. Hickman, 8009 N. State St., Eden, N.Y.
Original application Feb. 23, 1961, Ser. No. 91,102, now Patent No. 3,111,335, dated Nov. 19, 1963. Divided and this application May 6, 1963, Ser. No. 278,044
5 Claims. (Cl. 280—124)

This invention relates to a spring suspension for vehicles in which the vertical resilience is provided by helical metal compression springs and more particularly to a front steering axle.

This application is a division of my copending application Serial No. 91,102, filed February 23, 1961, now Patent No. 3,111,335, for Vehicle Spring Suspension for Rear Drive Axle.

One of the important objects of the present invention is to provide a spring suspension in which the vertical resilience is provided by metal helical compression springs in such manner as to provide the large amount of vertical axle movement necessary with highway vehicles to provide a vertical ride as soft as load heights will allow and at a low frequency both when empty and under full load.

Another important object is to provide such a suspension in which the vertical resilience is provided by helical compression springs and which is free from friction but is automatically controlled by an increasing resistance to motion in proportion to the amplitude and velocity of vertical frame and wheel movement relative to each other.

Another object is to provide such a suspension in which the vertical resilience is provided by helical compression springs and in which lateral, vertical angular, and a slight amount of longitudinal axle movements, with reference to the vehicle frame, are permitted and resiliently resisted, the lateral and angular resiliency with reference to the vehicle frame being sufficient to absorb the lateral thrust of the axle, particularly resulting from one wheel moving up and down, thereby to provide increased safety, tire and gasoline mileage and stability, and the longitudinal resiliency, with reference to the frame, being sufficient to eliminate detrimental vibrations due to rigidity of the axle lengthwise of the frame. The elimination of the axle rigidity vertically, longitudinally, and angularly, with reference to the vehicle frame, is required for maximum life of the frame, suspension, axle and tires as well as for maximum stability and safety and maximum economies in power as well as preservation of the cargo.

Another object is to provide such a suspension in which the vertical resiliency is provided by helical compression springs and in which the resistance to lateral or angular axle movement, with reference to the frame, is automatically controlled by an increasing resistance to motion in proportion to the amplitude and velocity of movement of the axles with reference to the frame.

Another object is to provide such a suspension in which the vertical resiliency is provided by helical compression springs and in which the requirement for lubrication is substantially eliminated.

Another object is to provide such a suspension in which the vertical resiliency is provided by helical compression springs and which will stand up without any servicing, repair or replacement for many years of service even under conditions of severe and constant use.

Another object is to provide such a suspension in which the vertical resiliency is provided by helical compression springs and in which the frame is cradled and supported at distantly spaced points so as to reduce frame stresses and increase stability.

Another object is to provide such a suspension in which the vertical resiliency is provided by helical compression springs and which is very light in weight, particularly in unsprung weight, as compared with conventional suspensions.

Another object is to provide such a suspension in which vertical resiliency is provided by helical compression springs and in which very little shock absorber control is required and in which the shock absorbers, both at the front and rear of the vehicle, can be housed within certain of the helical compression springs.

Another object is to provide such a suspension in which the vertical resiliency is provided by helical compression springs and which consists of compact units which can be arranged between each wheel and frame without interference with vertical, lateral and vertical angular axle movement of the axles with respect to the frame.

Another object is to provide a suspension in which the vertical resiliency is provided by helical compression springs and which provides a much wider spring base than that provided by conventional leaf springs.

Another object is to provide such a suspension in which the vertical resiliency is provided by helical compression springs and which can be easily taken down and replaced and which is low in cost as compared with conventional spring suspensions.

Another object is to provide such a suspension in which the vertical resiliency is provided by helical compression springs and which has a long two stage spring resistance range in both vertical and angular axle movement.

Another object is to provide a front or steering axle suspension in which the vertical resiliency is provided by helical compression springs and which provides a much wider spring base than that provided with conventional leaf springs.

Another most important object of the invention is to provide, for the front or steering axle, spring suspension in which the vertical resiliency is provided by helical compression springs and which permits the front or steering wheels to be turned or steered by the steering wheel to the shortest practical turning radius for the vehicle, but which subsequently prevents any lateral turning or steering movement of the steering wheels as a consequence of the vertical, lateral, angular or longitudinal movement of the front axle with reference to the vehicle frame.

Another object is to provide such a spring suspension for the front end of the vehicle in which the vertical resiliency is provided by helical compression springs and in which there is no necessity for adjustment of parts after the initial installation.

Another object is to provide such a spring suspension in which the vertical resiliency is provided by helical compression springs and having high and wide effective spring centers for maximum body roll and sidesway control with the maximum vertical resiliency and optimum control of wheel hop.

Another object of the invention is to provide such a spring suspension in which the vertical resiliency is provided by helical compression springs and which is lighter by several hundred pounds, particularly in unsprung weight, than conventional leaf spring suspensions.

Other objects and advantages of the invention will be apparent from the following description and drawings in which:

FIG. 1 is a fragmentary top plan view of the front end of a vehicle frame supported on a front steering axle and steering wheels by a spring suspension embodying the present invention, the construction of the parts at the opposite side of the vehicle being the same.

FIG. 2 is a fragmentary vertical section taken generally on line 2—2, FIG. 1, and showing the empty body position of the parts.

FIG. 3 is a fragmentary enlarged horizontal sectional view through the resiliently mounted frame plate along which a roller of the spring suspension at the front of the vehicle rides, this section being taken generally on line 3—3, FIG. 2.

FIG. 4 is a fragmentary vertical section taken generally on lines 4—4, FIGS. 1 and 5 and showing the empty body position of the parts.

FIG. 5 is a vertical section taken generally on line 5—5, FIG. 4, and again showing the empty body position of the parts.

The main frame 15 of the vehicle can be of any suitable construction and is shown as comprising a pair of main longitudinal side frame bars in the form of inwardly facing channels 16, which are straight and parallel and are connected by cross bars 18. The entire vehicle chassis, together with its spring suspension, is constructed substantially symmetrically about a vertical longitudinal medial plane, and hence it is deemed sufficient to confine the following detailed description to the one (left) side of the vehicle, it being understood that this description and the same reference numerals apply to the other (right) side of the vehicle.

In FIGS. 1-5 is illustrated the suspension for the front end of the vehicle and which is supported on a front steering axle 20 in the form of an I-beam extending transversely of the frame 15. Each end of this axle is supported by a front rubber tired steering wheel 21 which is supported on the axle and moved by any conventional form of steering gear so as to be movable about a generally vertical axis to the two dotted line positions shown in FIG. 1 for steering the vehicle either to the right or to the left. The specific form of the steering gear is of no consequence so far as the present invention is concerned and the only part of the steering gear which is illustrated is the conventional drag link 22, the front end of which is connected by the usual ball and socket joint 23 with the usual actuating arm (not shown) of the stub shaft for the wheel, and the rear end of which steering drag link 22 is connected by the usual ball and socket joint 24 to the lower end of the usual actuating arm 25 which is pivoted on the frame 15 for fore-and-aft movement.

Mounted on each end of the axle 20 is an axle bracket 28 which is shown as being in the form of a metal strap or bar formed to provide a flat top portion 29 arranged in the space between the corresponding front steering wheel 20 and the vertical longitudinal medial plane of the corresponding main longitudinal side frame bar 16. The ends of the axle bracket 28 are formed to provide ears 30 and 31 secured by bolts 32 and 33 to the end of the axle 20.

Each of these axle brackets 28 supports a pedestal indicated generally at 35 which comprises a cup-shaped base 36 having a side extension 37, the pedestal rising from this side extension 37 of the base alongside the corresponding main longitudinal side frame bar 16 for a purpose which will presently appear. The base 36 of the pedestal 35 is welded to the axle bracket 28 as shown at 38.

A helical metal compression spring 39 seated in the cup-shaped base 36 and is shown as held in position by an upstanding sleeve or boss 40 welded in this cup-shaped base as best shown in FIG. 5. The upper end of this helical compression spring supports a frame bracket indicated generally at 41. This frame bracket comprises a vertical attaching plate 42 secured by bolts 43 to the outer vertical face of the corresponding main longitudinal side frame bar 16 and has an inverted metal pocket 44 projecting outwardly therefrom in line with the cup-shaped base portion 36 of the pedestal 35. The inverted cup-shaped extension 44 of the frame bracket 41 is shown as reinforced by triangular webs 45 and the upper end of the helical compression spring 39 is held in centered relation by a sleeve 46 welded to the underside of the top wall of the pocket 44.

A feature of the invention resides in housing a one way shock absorber 50 within each helical compression spring 39. The shock absorber is of the telescopic type having an upper outer telescopic portion 51 with a threaded stud 52 extending through the top wall of the inverted pocket 44 and secured thereto by a nut 53, rubber washers 54 being arranged around the stud 52 on opposite sides of the top wall of the pocket 44 to permit limited lateral movement of the shock absorber without noise. The shock absorber also includes an inner telescopic portion 55 having a stud 56 extending through the bottom wall of the cup-shaped base 36 of the pedestal 35 and also the flat top 29 of the axle bracket 28. This stud is shown as secured to these last parts by a nut 58, rubber washers 59 being provided around the stud 56 on opposite sides of the bottom wall of the pedestal base 36 and also the underside of the axle bracket 28 to permit limited lateral movement of the shock absorber without noise. The one way shock absorber can be of any conventional form to resist upward or recoil movement of the frame 15 with reference to the axle 20 but to permit free downward movement of the frame 15 with reference to the axle.

The vertical plate 42 of the frame bracket 41 is extended rearwardly alongside the corresponding main longitudinal side frame bar 15 and at its rear end carries a vertical bracket 60 which projects downwardly from the main longitudinal side frame bar 16 as best shown in FIG. 4. A pair of parallel upper and lower parallelogram links 61 and 62 connect the upper and lower ends of each bracket 60 with ears 63 and 64 projecting rearwardly from the upper and lower ends of the pedestal 35, respectively. These links pivot about horizontal axes extending transversely of the line of movement of the vehicle and an important feature of the invention is that these links are substantially equal in length to the drag link 22 so as not to interfere with the steering of the vehicle.

In the upper end of the pedestal 35 is journalled a roller 65, this roller being rotatable about a horizontal pin 66 extending lengthwise of the line of movement of the vehicle. The roller can be of any suitable form but is shown as comprising a rubber body 68 vulcanized to a metal rim riding in a vertical guideway or offset central portion 70 of a metal plate 71 backed by a pair of vertical rubber blocks 72 which are arranged on opposite sides of the vertical guideway or offset central portion 70 and are sandwiched between the plate 71 and the vertical attaching plate 42 of the frame bracket 41. The vertical guideway or offset central portion 70 of the plate 71 is in spaced relation to the vertical attaching plate 42 of the frame bracket 41, as indicated at 73, so that the plate 71 is resiliently supported for horizontal movement toward and from its main longitudinal side frame bar 16, and the plate 71 and rubber blocks 72 are shown as secured to the vertical attaching plate 42 of its frame bracket 41 by bolts 74.

The pedestal 35 has a vertical opening 75 extending therethrough transversely of the line of movement of the truck and housing a depending rubber bottoming bumper 76 fixed to the underside of a bracket 78 in turn fixed to the rubber mounted frame plate 71 at the bottom of its guideway or central offset portion 70 thereof. This bumper 76 engages the base extension 37 of the pedestal 35 to provide a bottoming bumper for the front end suspension.

*Operation*

In the operation of the suspension, the upward movement of one end of the axle 20, through the axle bracket 28 and base 36 of the pedestal 35 compresses the helical compression spring 40. This upward force impressed upon this helical compression spring 40 is transmitted through the frame bracket 41 and its vertical attachment plate 42 to the corresponding main longitudinal side frame bar 16. It will be seen that the helical compression spring 40 can be selected to provide a vertical ride as soft as load height will allow and at a low spring frequency at the front end of the vehicle.

During this assumed upward movement of one end of the axle 20 the telescopic shock absorber 50 is compressed. This shock absorber, however, offers no substantial resistance to this upward movement of the axle, being a one way shock absorber which offers resistance only to the downward or rebound movement of the axle and with reference to the vehicle frame.

In this vertical upward movement of one end of the axle 20 the axle end is guided to move in a substantially vertical plane parallel with its axis by the adjacent pair of radius rods 61 and 62 which are of equal length and in parallelogram arrangement with pivotal connections at the upper and lower ends of the pedestal 35 so as to insure movement of the axle end in a substantially vertical plane extending transversely of the frame, except for the slight arcing of these radius rods. Since the drag link 22 of the steering gear is substantially equal in length to these radius rods 61, 62, this vertical movement of the axle end does not interfere with steering of the vehicle nor does this vertical movement of the axle result in any self-steering of the vehicle.

During this vertical movement of the axle end the roller 65 rides along the guideway or offset central portion 73 of the side plate 71 on the frame 15 of the vehicle. Since these rollers are provided at opposite sides of the vehicle, these rollers restrain the steering axle 20 against lateral movement with reference to the vehicle frame. This restraint is, however, resilient to provide lateral cushioning. Such resilience is shown as provided both by the rubber bodies 68 of these rollers and also by the rubber blocks 72 behind the side plates 71 along which the rollers ride. The rubber used in these parts is selected to provide the required lateral cushioning of the front steering axle 20 with reference to the vehicle frame.

Bottoming of either end of the front or steering axle 20 causes engagement between the bottoming bumper 76 and the lateral extension 38 of the base of the pedestal 35. It will be noted that this bottoming force is transmitted through the rubber bodies 72 behind the side plate 71 which carries the bottoming bumper 76.

The return or rebound downward movement of the axle is provided by the helical compression spring 40. However, the shock absorber 50 is effective against this rebound movement and serves to retard the rebound action of the spring against the end of the steering axle. However a relatively small retarding effect by the one way shock absorber 50 is required so that a small telescopic type of hydraulic shock absorber can be employed and, as shown, housed within each of the helical compression springs 40.

With reference to the front end suspension, the following points will be noted:

The parallelogram links 61, 62, being the same length as the drag link 22, insures proper steering geometry and at the same time holds the steering axle properly positioned lengthwise of the frame during its vertical movement.

To provide adequate support for the load, the spring frequency at the front of the truck is desirably on the high side of the human comfort ride. By the use of friction free helical compression springs 39 in combination with the single acting shock absorbers 50 which dampen the recoil action of these springs, a very acceptable ride is provided both for the cargo and also for the passenger.

The wide effective spring centers provided by these helical compression springs 39 prevent wheel tramp and control wheel hop, control of the latter being in proportion to the square of the spacing of these springs from each other laterally of the vehicle. The use of the coil springs 39 as shown permits the springs to be arranged outside of the vehicle frame without interference with steering of the vehicle as will be apparent from an inspection of FIG. 1. The wide spacing of the helical compression springs 39 also controls body roll and sidesway, this also being in proportion to the square of the spacing of the spring centers laterally of the vehicle.

The rollers 65 also control sidesway of the vehicle as well as controlling movement of the front axle laterally of the vehicle, this control of sidesway being due to both the high and wide spacing of these rollers. These rollers supplant the transverse radius rods usually used for such lateral control. However such radius rods would be undesirable with the front end suspension as shown because they would have to be at least two feet long to permit seven or eight inches of vertical axle travel without producing excessive movement of the axle laterally of the vehicle due to arcing, and the only space available for such long radius rods would be below the engine where they would reduce road clearance. Accordingly the use of widely spaced rollers 65 located at the elevation shown is an important feature of the front end spring suspension. It will also be noted that the rubber at the front end of the suspension permits the necessary angular movement of the front axle, that is, permits one wheel to rise independently of the companion wheel. This is, of course, essential.

Maximum tire and fuel mileage is also the product of unimpaired steering geometry, absence of wheel hop and track change and the cushioning of the front axle against vertical, lateral, angular, and longitudinal movements with reference to the vehicle frame.

Coil springs are inexpensive, light in weight, friction free and have proved to have been dependable, and the entire front end suspension is low in weight and light in cost as compared with leaf springs or independent wheel suspensions. The front end suspension is also free from service difficulties, it being possible to provide rubber bushings at the pivots and all of the radius rods and it being possible to provide bearings for the rollers which can be lubricated for the life of the vehicle.

It will therefore be seen that the present invention provides a front end suspension for a highway truck which achieves the objectives and has the advantages set forth.

I claim:

1. A vehicle spring suspension adapted to be interposed between a vehicle frame member and one end of an axle member having a rubber tired steering wheel journalled thereon to rotate about a generally horizontal axis and to be steered about a generally vertical axis, comprising a roller arranged to rotate with its axis extending generally horizontally and longitudinally of said frame, a vertical guide having rolling engagement with the periphery of said roller to restrain movement of said roller transversely of the frame, means mounting said roller on one of said members in the space between said frame member and steering wheel, a rubber block yieldingly mounting said vertical guide on the other of said members, said rubber block being positioned to yieldingly resist the pressure of said roller against said other of said members and to yieldingly restrain corresponding movement of said axle transversely of the frame member, a vertical helical compression spring having its lower end bearing against said end of said axle member and arranged in the space between said wheel and frame member and being behind the leading extremity of said steering wheel when said leading extremity is closest to the frame member and ahead of the trailing extremity of said steering wheel when said trailing extremity is closest to said frame member, a frame bracket secured to said frame member and projecting horizontally from the side thereof over said spring and supported thereby, and means restraining said axle member against horizontal movement longitudinally of said frame member.

2. A vehicle spring suspension adapted to be interposed between a vehicle frame member and one end of an axle member having a rubber tired steering wheel journalled thereon to rotate about a generally horizontal axis and to be steered about a generally vertical axis, comprising a roller arranged to rotate with its axis extending generally horizontally and longitudinally of said frame, a vertical guide having rolling engagement with the periphery of said roller to restrain movement of said roller transversely of the frame, resilient means mounting said roller on one of said members in the space between said frame member and steering wheel, a rubber block yieldingly mounting said vertical guide on the other of said members, said rubber block being positioned to yieldingly resist the pressure of said roller against said other of said members and to yieldingly restrain corresponding movement of said axle transversely of the frame member, a vertical helical compression spring having its lower end bearing against said end of said axle member and arranged in the space between said wheel and frame member and being behind the leading extremity of said steering wheel when said leading extremity is closest to the frame member and ahead of the trailing extremity of said steering wheel when said trailing extremity is closest to said frame member, a frame bracket secured to said frame member and projecting horizontally from the side thereof over said spring and supported thereby, and means restraining said axle member against horizontal movement longitudinally of said frame member.

3. A vehicle spring suspension adapted to be interposed between a vehicle frame and one end of an axle having a rubber tired steering wheel journalled thereon to rotate about a generally horizontal axis and to be steered about a generally vertical axis, comprising a pedestal having its base fixed to said axle adjacent said wheel and projecting upwardly into the space between said wheel and frame and being arranged behind the leading extremity of said steering wheel when said leading extremity of said steering wheel is closest to the frame and ahead of the trailing extremity of said steering wheel when said trailing extremity is closest to the frame, a vertical helical compression spring mounted on said base of said pedestal and projecting upwardly therefrom, a frame bracket secured to said frame and projecting horizontally from the side thereof over said spring and supported thereby, a roller journalled on said pedestal to rotate about a generally horizontal axis extending lengthwise of said frame and having a portion of its periphery opposing said frame, a guide plate having a vertical guideway fitting said portion of said periphery and along which said periphery rides, resilient means securing said guide plate to said frame and permitting yielding horizontal movement of said guide plate toward and from said frame transversely thereof, and means restraining said axle against horizontal movement longitudinally of the frame.

4. A vehicle spring suspension adapted to be interposed between a vehicle frame member and one end of an axle member having a rubber tired steering wheel journalled thereon to rotate about a generally horizontal axis and to be steered about a generally vertical axis, comprising roller means arranged to rotate with its axis extending generally horizontally and longitudinally of said frame, vertical guide means having rolling engagement with the periphery of said roller means to restrain movement of said roller means transversely of the frame, means mounting said roller means on one of said members in the space between said frame member and steering wheel, a yielding member included in one of said means and operatively positioned to yieldingly resist the pressure of said roller means against said other of said members and to yieldingly restrain corresponding movement of said axle transversely of the frame member, a vertical helical compression spring having its lower end bearing against said end of said axle member and arranged in the space between said wheel and frame member and being behind the leading extremity of said steering wheel when said leading extremity is closest to the frame member and ahead of the trailing extremity of said steering wheel when said trailing extremity is closest to said frame member, a frame bracket secured to said frame member and projecting horizontally from the side thereof over said spring and supported thereby, and means restraining said axle member against horizontal movement longitudinally of said frame member.

5. A vehicle spring suspension as set forth in claim 4 wherein said yielding member is in the form of a rubber body interposed between the periphery of said roller and its said axis.

References Cited in the file of this patent
UNITED STATES PATENTS

| | | |
|---|---|---|
| 1,067,751 | Nottingham | July 15, 1913 |
| 2,563,370 | Reese | Aug. 7, 1951 |
| 2,637,569 | Turner | May 5, 1953 |
| 2,994,396 | Bidwell | Aug. 1, 1961 |
| 3,074,737 | Peras | Jan. 22, 1963 |